R. C. OLSON.
TOOL HANDLE.
APPLICATION FILED OCT. 4, 1920.
1,409,311.
Patented Mar. 14, 1922.
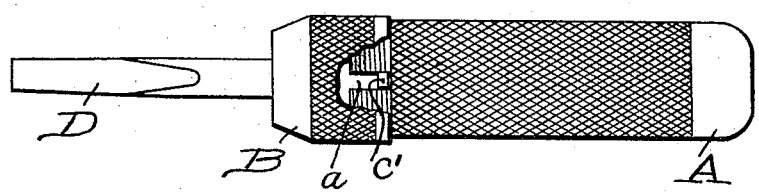
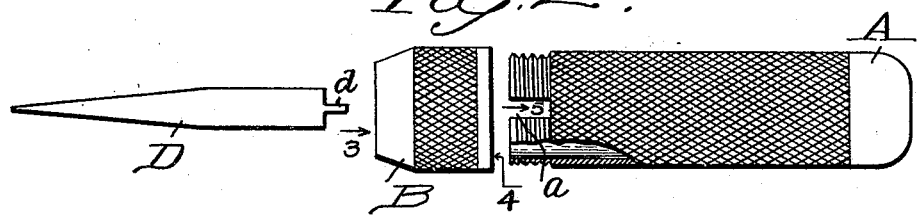
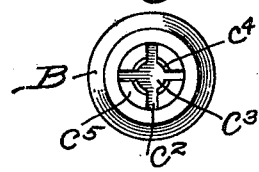
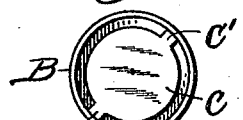
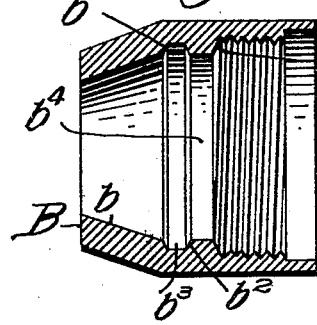
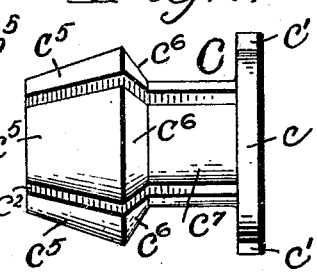
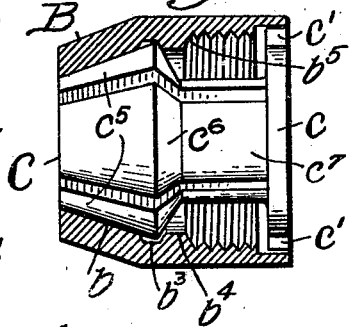
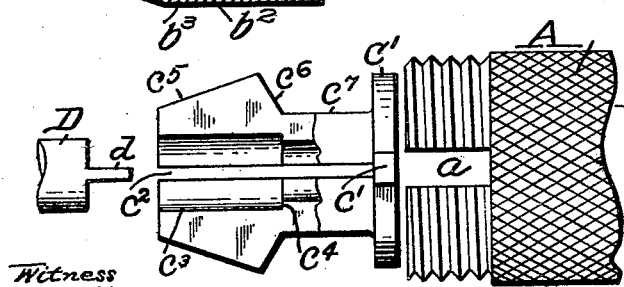
Inventor
Robert C. Olson
By Attorneys
Southgate & Southgate
Witness
C. F. Mason

UNITED STATES PATENT OFFICE.

ROBERT C. OLSON, OF WORCESTER, MASSACHUSETTS.

TOOL HANDLE.

1,409,311.  Specification of Letters Patent.  Patented Mar. 14, 1922.

Application filed October 4, 1920. Serial No. 414,480.

*To all whom it may concern:*

Be it known that I, ROBERT C. OLSON, a citizen of the United States, residing at Worcester, in the county of Worcester and State of Massachusetts, have invented a new and useful Tool Handle, of which the following is a specification.

This invention relates to a tool handle for a screw driver, gimlet or any other tool and to means associated therewith for gripping the shank of a tool and controlling it from the handle. The principal objects of the invention are to provide a very simple construction that can be made mostly by ordinary metal pressing processes; to provide it with means whereby the tool shank can be positively connected with the handle and operated thereby directly, independently of the sleeve which is mounted thereon and these two parts will abut with a solid bearing surface so as to stand heavy blows on the end of the handle; to provide a simple means whereby the tool holding chuck will be rotatably held in the sleeve or cover on the end of the handle by simply pressing it into position; to provide means whereby the screw-threaded end of the handle will lock the chuck thereto before entering the thread; and to so connect the parts that the shank of the tool will be gripped firmly when the sleeve is screwed up tightly in position and will be loosened so that it can be withdrawn when the sleeve is loosened, although still positively connected with the handle to be turned thereby. The invention also involves the manufacture of these parts in a simple and neat form in which the sheet metal handle can be used as a casing for holding several tools, and involves improvements in the details of construction as will appear.

Reference is to be had to the accompanying drawings in which—

Fig. 1 is a side elevation of a tool constructed in accordance with this invention, partly broken away to show interior construction;

Fig. 2 is a similar view showing the parts separated;

Fig. 3 is an end view thereof with the tool removed;

Fig. 4 is an opposite end view of the tool gripping device removed from the handle;

Fig. 5 is an end view of the open end of the handle;

Fig. 6 is a longitudinal central sectional view on enlarged scale of the sleeve;

Fig. 7 is a side elevation of the tool clamping jaw member;

Fig. 8 is a view of the parts shown in Figs. 6 and 7 assembled; and

Fig. 9 is a side view at right angles to the position shown in Fig. 8 showing how the tool clamping jaw member and the handle are assembled and how they co-operate.

This invention is shown in a simple and practical form in which it comprises three members, a hollow handle A, a hollow sheet metal sleeve B and a tool clamping member C, the latter comprising a set of jaws for holding a tool, as for example, a screw driver, D. The members B and C when assembled constitute a tool holding chuck.

The member A preferably is formed from sheet metal by pressing it out by ordinary die-pressing processes. It is closed at one end and open at the other so as to constitute a casing or holder for a plurality of tools similar to the tool D. This handle is shown as having a wide knurled surface on the outside so it can be gripped strongly with the hand for operating the tool. It has a screw threaded open end and is provided with two opposite central slots $a$ extending substantially through the screw threaded portion at the end and having square shoulders at their bottoms which, as will appear, have an important function.

The sleeve B is shown as provided with a knurled exterior cylindrical surface for use in assembling and disassembling the parts. It is screw threaded on the interior for engagement with the screw thread on the handle A. At the other end it is tapered or conical in shape both inside and outside. The inner conical surface $b$ has at its inner end a shoulder $b'$ and a second shoulder $b^2$ opposite it and spaced a little from it. This provides a groove $b^3$ entirely surrounding it inside at a distance from the end of the screw thread.

The tool gripping member C comprises a flat circular steel plate $c$ at one end having two small diametrical projections $c'$ adapted to enter the slots $a$. This constitutes a closure or cap for the open end of the hollow handle A or magazine. Extending from this plate are a plurality of jaws. Any desired number can be used but it is convenient to make this of a piece turned up circularly in a lathe or otherwise and to form these jaws by cutting slots diametrically through it down to the plate $c$. Extending down through the center from the jaw end to the surface of the plate $c$ is a cylindrical hole $c^3$. This has a shoulder $c^4$ inside caused by the reduction in its diameter at a point about half way down. This construction thus provides four jaws integrally connected with each other at the plate $c$ and capable of yielding on account of their comparatively small shanks. Each of these jaws has a conical surface $c^5$ adapted to engage the surface $b$ and a second conical surface $c^6$ extending inwardly from it to the cylindrical surface $c^7$ which constitutes the outside surface of the shank of each jaw. This reduces the thickness of the metal at this shank so as to permit the jaws to yield and be forced together when this member C is forced into the sleeve B and the conical surface $c^5$ forced against the inner conical surface $b$. When this is accomplished it causes the jaws to clamp against the shank of the tool D as will be obvious.

It is to be noticed therefore, as most clearly shown in Fig. 8, that when this member C is forced into the sleeve B the larger end of the conical part $c^5$ is forced over the inwardly projecting rib $b^4$ into the groove $b^3$. This is done at the factory for the purpose of assembling the parts and after it is accomplished the parts B and C are considered as constituting a single self-contained element of the device, for thereafter they remain together until repairs are needed. They are held together by spring action. When assembled the member C is freely rotatable in the sleeve B, the two projections $c'$ having full play to rotate in a space at the large end of the sleeve B. These two parts cannot be separated by ordinary methods or usage. At least, they are not likely to be separated accidentally because the largest portion of the double cone consisting of the two adjacent parts of the surfaces $c^5$ and $c^6$ extends within the groove $b^3$ and the rib $b^4$ extends too far in to permit withdrawal. However, it is to be noted that the conical surface $b^5$ is arranged at a much sharper angle to the axis than the conical surface $c^6$. Therefore, if more pressure is exerted to force the inner member C out, in a direction contrary to that by which it entered, the jaws can be made to yield and the parts disassembled in that way without injuring either element.

The tool D is provided with a flat diametrical projection $d$ on its butt end for the purpose of entering the ends of either slot $c^2$ as the butt end of the tool comes up against the shoulder $c^4$. In this way the tool is caused to turn positively with the tool clamping member C even if, for any reason, the jaws should not grip the shank of the tool sufficiently to accomplish this result. In fact, the gripping of the jaws against the shank of the tool due to the forcing of the surface $c^5$ against the surface $b$ is more for the purpose of exactly centering the tool than of gripping it, but it also assists in driving the tool. This gripping of the tool by the jaws is brought about by screwing the handle A up into the sleeve B so far that the projections $c'$ come against the flat bottoms of the two slots $a$. Then a slight additional turn on the handle imparts pressure to these projections $c'$ and forces the whole member C forwardly to cause the jaws to grip the shank of the tool. It will be noted that even if done carelessly so that this action is not fully performed and the jaws do not grip the tool firmly, the tool can be manipulated and will turn positively with the handle A. The handle is positively connected with the member C through the projections $c'$ and the member C is positively connected with the tool through the projection $d$. As the projections $c'$ seat against the bottoms of the slots $a$, pressure is transmitted directly from the handle through the member C to the tool. Therefore one can hammer on the end of the handle without danger of displacing any of the parts. By having the plate $c$ flush with the end of the sleeve B the operator can insert the end of the handle in place so that it controls the rotation of the tool before the screw-threads engage. This is an improvement of importance in practice because otherwise an inexperienced user would have trouble in assembling the parts.

From the description of the use of the device which has been given it will be seen that it is of a simple and convenient construction; that the tool is positively connected with the handle even when used by a careless operator and therefore is always under the control of the handle as long as it is in position; that the parts are put together and taken apart by the operator in the simplest possible way and also the process of assembling the parts for operation and taking out the member C are reduced to simplest terms.

Although I have illustrated and described only a single form of the invention I am aware of the fact that modifications can be made therein by any person skilled in the art without departing from the scope of the invention as expressed in the claims.

Therefore, I do not wish to be limited to all the details of construction herein shown and described but what I claim is:

1. The combination of a set of jaws for clamping the shank of a tool, and a sleeve in which the jaws are located, said sleeve and jaws having co-operating yielding means for holding the jaws rotatably in the sleeve, said jaws having a plate or base integral therewith and flush with the end of the sleeve, said plate having lugs, a handle having slots arranged to receive said lugs when the handle is engaged with the sleeve, and a connection between the handle and sleeve arranged to force the jaws into the sleeve upon a relative longitudinal motion between the sleeve and handle.

2. The combination of a set of jaws and a sleeve in which the jaws are located, said sleeve having an abrupt conical shoulder for holding the jaws rotatably in the sleeve when the jaws are pushed in, said jaws being permanently connected together so as to be capable of being handled as one piece and being yieldingly constructed to permit them to be forced into place in the sleeve, the base of said jaws constituting a plate substantially filling the end of the sleeve except for a circumferential space for receiving the circular end of a handle, said plate and handle having interengaging means for positively transmitting the motion of the handle to the jaws.

3. In a tool holder the combination with a hollow sleeve having a tapered end and a circumferential groove at the large end of the tapered inside and having continuous circumferential walls on both sides thereof, of a jaw member having yielding jaws provided with a tapering surface for engaging said tapered surface of said sleeve, the butt end of the tapered surface on the jaws being of larger diameter than the interior surface of the walls at the side of said groove and terminating in a shoulder engaging the rear wall of the groove, whereby when the jaws are forced in until said butt end enters the groove the jaw member will be assembled in the sleeve and can be withdrawn only by contracting the jaws.

4. In a tool holder, the combination of a sleeve tapered inside and having a groove at the large end of the tapered surface, a jaw member having yielding jaws provided with an external conical surface for engaging said tapered surface of the sleeve, the butt end of the conical surface on the jaws being of larger diameter than the maximum diameter of the taper at the side of said groove, whereby when the jaws are forced in until said butt end enters the groove the jaw member will be rotatedly secured therein, said jaws also having a second conical surface beyond the first one tapering more rapidly but in the opposite direction to form an abrupt shoulder, whereby when assembled the jaw member can be forced out of the sleeve rearwardly, but only by the exertion of greater pressure than was required to force it in.

5. The combination of a sheet metal sleeve having a conical end, a groove at the base of the cone, and a screw thread at the large end, said screw thread terminating at a distance from the large end, with an interior jaw member comprising a plate adapted to rest rotatably within the unthreaded large end of the sleeve and located substantially flush with its end, having a plurality of jaws extending therefrom and having a conical surface at the end adapted to enter said groove at its butt end and provided with shanks between the conical surface and said plate, said plate having a projection, and a handle adapted to be connected with the sleeve by said screw-thread, and having means for cooperating with said projection to transmit its rotary motion positively to the plate and jaws.

6. In a tool holder, the combination with a handle having a screw thread at its extreme open end, of a sleeve having a screw thread spaced from its end by which it is adapted to be screwed on the handle, and a tool gripping jaw member rotatably mounted in the sleeve and having a set of jaws for gripping a tool shank, said handle and jaw member having means for interlocking them located in position to engage each other before their screw threads engage when the parts are being assembled.

7. In a tool holder, the combination with a handle having a screw thread at its open end, of a sleeve having a screw thread by which it is adapted to be screwed thereon and having a tapered inner surface at the other end, and a tool gripping jaw member rotatably mounted in the sleeve and having a set of spring jaws for gripping a tool shank, the outside surfaces of said jaws being tapered for engaging the inner tapered surface of the sleeve, said handle and jaw member having interengaging elements for locking them together, said elements being located in such position that when the handle and jaw member are assembled said elements will engage before the screw threads engage.

In testimony whereof I have hereunto affixed my signature.

ROBERT C. OLSON.